(12) United States Patent
Lee et al.

(10) Patent No.: US 9,025,714 B2
(45) Date of Patent: May 5, 2015

(54) SYNCHRONOUS DATA SYSTEM AND METHOD FOR PROVIDING PHASE-ALIGNED OUTPUT DATA

(71) Applicant: Raytheon Company, Waltham, MA (US)

(72) Inventors: Jack W. Lee, Sudbury, MA (US); Michael E. Yeomans, Framingham, MA (US); Carissa L. Pichon, Marlborough, MA (US); James P. Dumais, Lunenburg, MA (US)

(73) Assignee: Raytheon Company, Waltham, MA (US)

( * ) Notice: Subject to any disclaimer, the term of this patent is extended or adjusted under 35 U.S.C. 154(b) by 28 days.

(21) Appl. No.: 13/873,720

(22) Filed: Apr. 30, 2013

(65) Prior Publication Data

US 2014/0321514 A1 Oct. 30, 2014

(51) Int. Cl.
| H04L 7/00 | (2006.01) |
| H04B 1/26 | (2006.01) |
| H04L 1/20 | (2006.01) |
| H04L 7/033 | (2006.01) |

(52) U.S. Cl.
CPC ....... *H04L 1/205* (2013.01); *H04L 7/00* (2013.01); *H04L 7/0338* (2013.01)

(58) Field of Classification Search
CPC .......... G06F 1/10; H04J 3/0685; H04L 7/033; H04L 7/0891
USPC ............... 375/356, 326, 340, 355, 372, 376; 455/307, 325; 227/156; 327/156
See application file for complete search history.

(56) References Cited

U.S. PATENT DOCUMENTS

| 6,289,068 B1 | 9/2001 | Hassoun et al. | |
| 6,774,823 B1 | 8/2004 | Schafferer | |
| 7,624,296 B2 | 11/2009 | Peters | |
| 2004/0247065 A1 | 12/2004 | Holzle | |
| 2006/0034395 A1* | 2/2006 | Evans et al. | 375/326 |
| 2006/0133466 A1 | 6/2006 | Palmer et al. | |
| 2009/0085616 A1 | 4/2009 | Wada et al. | |
| 2010/0166132 A1* | 7/2010 | Tang et al. | 375/372 |

OTHER PUBLICATIONS

"Analog Devices—1 GSPS, 14-Bit, 3.3 V CMOS Direct Digital Synthesizer", Data Sheet—AD 9910 © 2007-2012 Analog Devices, Inc., (2007-2012), 64 pgs.
Hwang, S.-S., et al., "A DLL based 10—320MHz Clock Synchronizer", *ISCAS 2000—IEEE International Symposium on Circuits and Systems*, (May 28-31, 2000, Geneva, Switzerland), (2000), V-265-V-268.

(Continued)

*Primary Examiner* — Khai Tran
(74) *Attorney, Agent, or Firm* — Schwegman Lundberg & Woessner, P.A.

(57) ABSTRACT

Embodiments of a synchronous data system and method for generating phase-aligned output data are generally described herein. In some embodiments, the synchronous data system includes a plurality of transmitter-receiver (TX-RX) pairs, each associated with a delay-locked loop (DLL) and arranged to generate corresponding output data stream based on a high-speed clock of the associated TX-RX pair. The DLL associated with each TX-RX pair is a phase-shifter DLL that includes an adjustable phase shifter arranged to minimize the phase error between the system clock and the module clock to edge-align the high-speed clocks of each TX-RX pair.

17 Claims, 2 Drawing Sheets

(56) References Cited

OTHER PUBLICATIONS

Yang, C.-K. K., "Delay-Locked Loops, An Overview", In: *Phase-Locking in High-Performance Systems, IEEE Press*, (2003), 13-21.

"International Application Serial No. PCT/US2014/035999, International Search Report mailed Feb. 6, 2015", 3 pgs.

"International Application Serial No. PCT/US2014/035999, Written Opinion mailed Feb. 6, 2015", 6 pgs.

* cited by examiner

SYNCHRONOUS DATA SYSTEM AND METHOD FOR PROVIDING PHASE-ALIGNED OUTPUT DATA

GOVERNMENT RIGHTS

This invention was not made with Government support. The Government does not have certain rights in this invention.

TECHNICAL FIELD

Embodiments pertain to synchronous digital systems. Some embodiments relate to digital receivers. Some embodiments relate to the generation of phase-aligned data. Some embodiments relate to generation of RF signals including the generation of Linear-Frequency Modulated (LFM) waveforms.

BACKGROUND

Synchronous digital systems rely on one or more clock signals to synchronize elements across the system. Conventionally, one or more clock signals are distributed across the system on one or more clock lines. Data within the system may be generated based on each clock. However, due to various reasons including initial state of logic gates, clock buffer delays, high capacitance of heavily loaded clock lines and propagation delays, the edges of a clock signal in different parts of the system may not be adequately synchronized making it difficult to generate synchronous data, particularly phase-aligned data. When edge alignment of each clock is achieved, the data is synchronous and phase aligned.

Some conventional techniques for generating synchronous data use phase-locked loops (PLLs) that rely on a voltage-controlled oscillator (VCO). The use of such PLLs may result in unacceptable jitter and poor noise performance due the operation of the VCO. Some other conventional techniques for generating synchronous data use a master-slave approach in which slave devices are synchronized with a single master device. The use of a single master device can be a single point of failure reducing system reliability.

Thus, there are general needs for improved systems and methods for generating synchronous data, including phase-aligned data. There are also general needs for systems and methods for generating phase-aligned data with improved jitter and phase-noise performance. There are also general needs for systems and methods for generating phase-aligned data that do not rely on a single master device.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
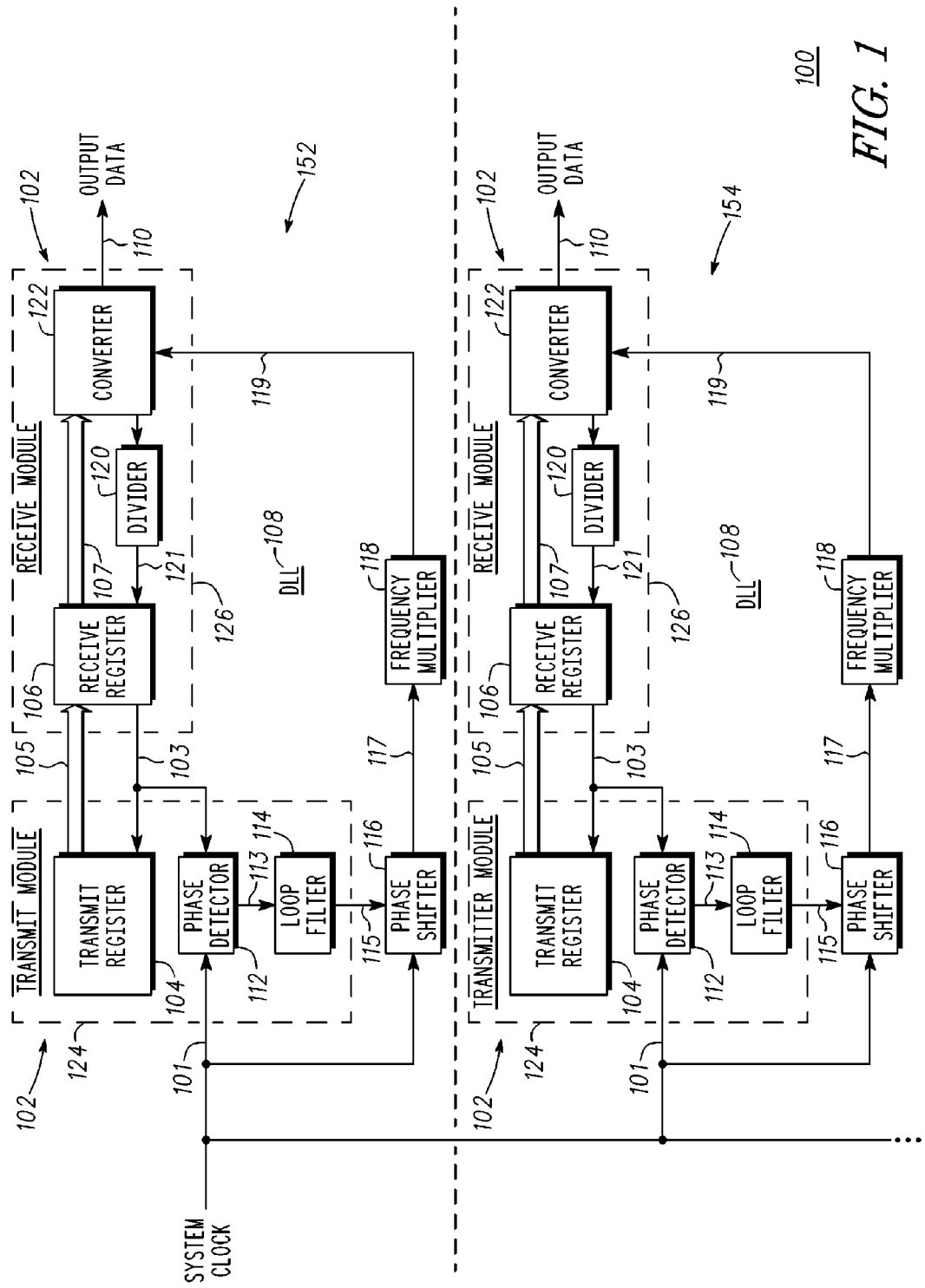
FIG. 1 is a functional diagram of a synchronous data system in accordance with some embodiments.

FIG. 1 is a functional diagram of a synchronous data system in accordance with some embodiments. Synchronous data system 100 may comprise a plurality of transmitter-receiver (TX-RX) pairs 102. Each TX-RX pair 102 may be associated with a delay-locked loop (DLL) 108 and arranged to generate corresponding output data 110 based on a high-speed clock 119. The DLL 108 may be a phase-shifter DLL that includes an adjustable phase shifter 116. The DLL 108 associated with each TX-RX pair 102 may be arranged to synchronize (e.g., phase-match or phase-align) the module clock 103 of the TX-RX pair 102 to a system clock 101 so that the output data 110 of the TX-RX pairs 102 become phase aligned with each other. The adjustable phase shifter 116 may be arranged to minimize a phase error between the system clock 101 and the module clock 103 to edge-align the clocks (i.e., the module clocks 103 and/or the high-speed clocks 119) of each TX-RX pair 102. When edge alignment of the clocks is achieved, the data 110 of each TX-RX pair 102 is synchronous and phase aligned.

In these embodiments, each TX-RX pair 102 may generate synchronous output data 110 with improved jitter and phase-noise performance. Furthermore, the synchronous data system 100 does not rely on a single master device thus providing increased reliability.

In some embodiments, the output data 110 may be coherent with each other. In some embodiments, the synchronous data system 100 may be used to achieve synchronization of multiple data streams in a digital receiver. In some RADAR embodiments, the output data 110 may be used to generate Linear-Frequency Modulated (LFM) waveforms. These embodiments are discussed in more detail below.

In accordance with some embodiments, each TX-RX pair 102 may include a transmit register 104 and a receive register 106. The module clock 103 may be forwarded from the receive register 106 to the transmit register 104 for use in clocking a parallel data stream 105 from the transmit register 104 to the receive register 106. The system clock 101 may be sourced to each TX-RX pair 102. In these embodiments, each TX-RX pair 102 implements a clock-forwarding scheme and may clock data on either the rising or falling edges of the module clock 103.

In some embodiments, the DLL 108 of each TX-RX pair 102 may comprise a phase detector 112 to generate a phase-detector output 113 based on a phase difference between the module clock 103 and the system clock 101. The DLL 108 of each TX-RX pair 102 may also include an adjustable phase shifter 116 to adjust the phase of the system clock 101 based on the phase-detector output 113 and to generate a phase-adjusted module clock signal 117 for use by the associated TX-RX pair 102 in generating an associated one of the output data 110. The phase-adjusted module clock signal 117 may be used to generate the module clock 103.

In these embodiments, the DLL 108 is a phase-shifter DLL that uses the adjustable phase shifter 116 to control the phase of the forwarded clock hence changing the delay. Unlike some conventional DLLs which use delay lines, DLL 108 uses the adjustable phase-shifter 116 as the delay element. In these embodiments, a significant reduction in phase noise may be achieved over conventional techniques that use a PLL with a VCO for synchronization or where the delay adjustment is achieved by altering the biasing of buffer(s). In these embodiments, since the system clock 101 is sourced to each TX-RX pair 102, the module clock 103 and data transfers within each TX-RX pair 102 are synchronous to each other. In some embodiments, the adjustable phase shifter 116 may be a voltage-dependent phase shifter. Unlike some conventional techniques, phase shifting is not done in discrete steps.

In some embodiments, the DLL 108 of each TX-RX pair 102 may also include a loop filter 114 to operate on the phase-detector output 113 and provide a loop-filter output 115 to the adjustable phase shifter 116. In these embodiments, the loop filter 114 may perform averaging on the phase-detector output 113.

In some embodiments, the phase detector 112, the loop filter 114 and the adjustable phase shifter 116 of each TX-RX pair 102 may be part of a closed loop system arranged to minimize the phase error between the system clock 101 and the module clock 103. In these embodiments, close loop control of the DLL 108 of each TX-RX pair 102 may minimize the phase error between the system clock 101 and the module clock 103. The phase detector 112 outputs a phase difference between the system clock 101 and the module clock 103 where it is fed into the loop filter 114. The output 115 of the loop filter 114 adjusts the phase shifter 116 such that the phase of the module clock 103 closely matches the phase of the system clock 101. This configuration sets the DLL 108 with negative feedback where the phase difference between the system clock 101 and module clock 103 is driven to a small value.

In some embodiments, each TX-RX pair 102 may also include a frequency multiplier 118 to frequency multiply the phase-adjusted module clock signal 117 and generate a high-speed clock 119. Each TX-RX pair 102 may also include a frequency divider 120 to divide down the high-speed clock 119 to produce a divided clock 121 corresponding to the module clock 103. Each TX-RX pair 102 may also include a converter 122 to receive the parallel data stream 107 from the receive register 106 and generate output data 110 based on the high-speed clock 119. The divided clock 121 may correspond to the module clock 103 and may be used by the receive register 106 for clocking data. In these embodiments, logic circuits of each TX-RX pair 102 may be clocked very closely to the same edge of the system clock.

In some embodiments, the converter 122 of each TX-RX pair 102 may comprise a parallel-to-serial (P/S) converter. In these embodiments, the output data 110 comprises digital signals and the high-speed clock 119 of each TX-RX pair 102 may be edge-aligned. In some alternate embodiments, the converter 122 of each TX-RX pair 102 may comprise a digital-to-analog converter (DAC). In these embodiments, the output data 110 may comprise analog signals and the high-speed clock 119 of each TX-RX pair 102 may be edge-aligned.

In some embodiments, each TX-RX pair 102 and its associated DLL 108 may be provided on a circuit-card assembly (CCA), although this is not a requirement. In these embodiments, the system clock 101 may be sourced to each CCA. As illustrated in FIG. 1, a first TX-RX pair may be provided on a first CCA 152 and a second TX-RX pair may be provided on a second CCA 154. Although only two CCAs are shown, the synchronous data system 100 may include many CCAs (e.g., up to ten or more), each of which uses the system clock 101 as a reference. In some embodiments, each TX-RX pair 102 and its associated DLL 108 may be considered a separate module.

In some embodiments, for each TX-RX pair 102, the transmit register 104, the phase detector 112 and the loop filter 114 may be implemented within a field-programmable gate array (FPGA) 124, although the scope of the embodiments is not limited in this respect. In some embodiments, for each TX-RX pair 102, the receive register 106, the converter 122, and the frequency divider 120 may be implemented within an integrated circuit (IC) 126, although the scope of the embodiments is not limited in this respect. For each TX-RX pair 102, the adjustable phase shifter 116 and the frequency multiplier 118 may be implemented external to the FPGA 124 and the integrated circuit 126, although the scope of the embodiments is not limited in this respect.

In some embodiments, the data of the parallel data stream 105 that is clocked from the transmit register 104 to the receive register 106 may be provided from a data source external to the FPGA 124, although this is not a requirement.

In some RADAR embodiments, the synchronous data system 100 may also include circuitry to generate Linear Frequency Modulated (LFM) waveforms from the output data 110, although the scope of the embodiments is not limited in this respect. In these RADAR embodiments, the output data 110 from each CCA may comprise digital words or analog signals that represent LFM waveforms. Accordingly, LFM waveforms may be generated with improved jitter and phase-noise performance. In some of these embodiments, the synchronous data system 100 may be part of a RADAR receiver.

In these embodiments, each CCA may be used to generate LFM waveforms which are phase aligned to the system clock 101. As such, the output data 110 of each CCA may be phase aligned to each other. Accordingly, each FPGA 124 may be made synchronous to each other.

Although the synchronous data system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, FPGAs, application specific integrated circuits (ASICs), radio-frequency integrated circuits (RFICs) and combinations of various hardware and logic circuitry for performing at least the functions described herein. In some embodiments, the functional elements of the synchronous data system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the synchronous data system 100 may include one or more processors and may be configured with instructions stored on a computer-readable storage device.

Figure 2:
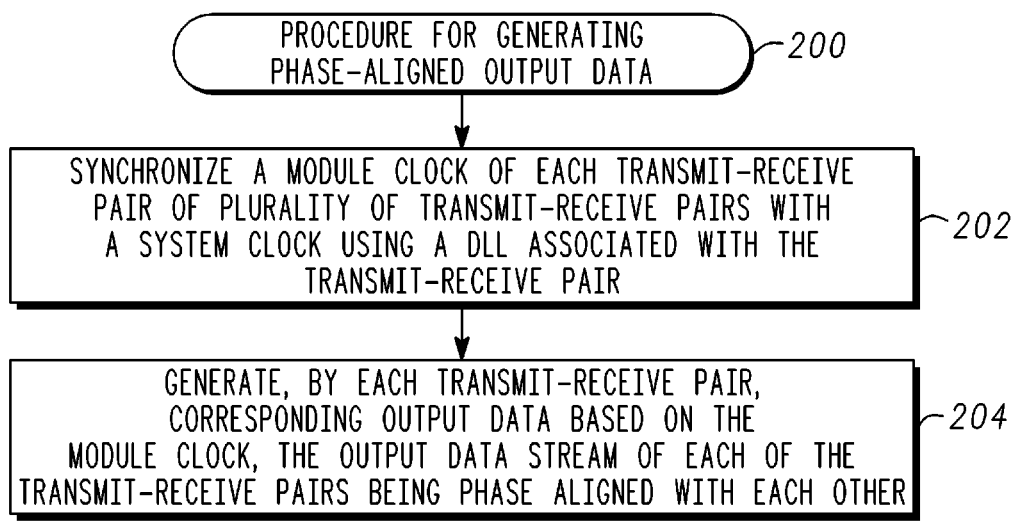
FIG. 2 is procedure for generating phase-aligned output data in accordance with some embodiments.

FIG. 2 is procedure for generating phase-aligned output data in accordance with some embodiments. Procedure 200 may be performed by a synchronous data system, such as synchronous data system 100 (FIG. 1), although other configurations may also be suitable.

In operation 202, for each output data stream, a module clock is synchronized with a system clock using a DLL. The DLL may be a phase-shifter DLL that includes an adjustable phase shifter. In some embodiments, module clock 103 (FIG. 1) of each TX-RX pair 102 may be synchronized (e.g., phase-matched or phase-aligned) with a system clock 101 (FIG. 1) using DLL 108 (FIG. 1). In some embodiments, the phase error between the system clock 101 and the module clock 103 may be minimized through the operation of the DLL 108.

In operation 204, a corresponding one of the output data may be generated based on the module clock. The output data may be phase-aligned with each other due to the operation of the DLL. In some embodiments, corresponding output data may be generated by each TX-RX pair 102 based on the module clock 103. In some embodiments, the output data of each TX-RX pair 102 may comprise digital signals and the high-speed clock 119 is edge aligned to each other. In some other embodiments, the output data of each TX-RX pair 102 may comprise analog signals and the high-speed clock 119 is edge aligned to each other.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A synchronous data system comprising:
   a plurality of transmitter-receiver (TX-RX) pairs, each TX-RX pair associated with a delay-locked loop (DLL) and arranged to generate corresponding output data based on a high-speed clock of an associated TX-RX pair,
   wherein the DLL associated with each TX-RX pair is arranged to synchronize a module clock of the TX-RX pair to a system clock so that the output data of the TX-RX pairs is phase-aligned, and
   wherein the DLL is a phase-shifter DLL that includes an adjustable phase shifter arranged to minimize a phase error between the system clock and the module clock to edge-align the high-speed clock of each TX-RX pair.

2. The synchronous data system of claim 1 each TX-RX pair includes a transmit register and a receive register,
   wherein the module clock is forwarded from the receive register to the transmit register for use in clocking a parallel data stream from the transmit register to the receive register, and
   wherein the system clock is sourced to each TX-RX pair.

3. The synchronous data system of claim 2 wherein the DLL of each TX-RX pair comprises a phase detector to generate a phase-detector output based on a phase difference between the module clock and the system clock,
   wherein the adjustable phase shifter is arranged to adjust a phase of the system clock based on the phase-detector output and to generate a phase-adjusted module clock signal for use by the associated TX-RX pair in generating the high-speed clock for generation of an associated one of the output data,
   wherein the phase-adjusted module clock signal is used to generate the module clock.

4. The synchronous data system of claim 3 wherein the DLL of each TX-RX pair further comprises a loop filter to operate on the phase-detector output and provide a loop-filter output to the adjustable phase shifter.

5. The synchronous data system of claim 4 wherein the phase detector, the loop filter and the adjustable phase shifter of each TX-RX pair are part of a closed loop system arranged to minimize the phase error between the system clock and the module clock.

6. The synchronous data system of claim 5 wherein each TX-RX pair further includes a frequency multiplier to frequency multiply the phase-adjusted module clock signal and generate the high-speed clock, and
   a frequency divider to divide down the high-speed clock to produce a divided clock corresponding to the module clock for use by the receive register.

7. The synchronous data system of claim 6 wherein each TX-RX pair further comprises a converter to receive the parallel data stream from the receive register and generate one of the output data based on the high-speed clock.

8. The synchronous data system of claim 7 wherein the converter is a parallel-to-serial converter, and
   wherein when the output data comprise digital signals that are phase-aligned when the high-speed clocks of each TX-RX pair are edge aligned.

9. The synchronous data system of claim 7 wherein the converter is a digital-to-analog converter, and
   wherein when the output data comprise analog signals that are phase-aligned when the high-speed clocks of each TX-RX pair are edge aligned.

10. The synchronous data system of claim 6 wherein for each TX-RX pair, the transmit register, the phase detector and the loop filter are implemented within a field-programmable gate array (FPGA),
    wherein for each TX-RX pair, the receive register, the converter, and the frequency divider are implemented within an integrated circuit, and
    wherein for each TX-RX pair, the adjustable phase shifter and the frequency multiplier are implemented external to the FPGA and the integrated circuit.

11. The synchronous data system of claim 6 further comprising circuitry to generate Linear Frequency Modulated (LFM) waveforms from the output data.

12. A method for generating phase-aligned output data with a plurality of transmitter-receiver (TX-RX) pairs, the method comprising:
    synchronizing a module clock of each TX-RX pair with a system clock using a delay-locked loop (DLL) associated with the TX-RX pair; and
    generating corresponding output data with an associated one of a plurality of TX-RX pairs based on a high-speed clock of an associated TX-RX pair, the output data of the TX-RX pairs being phase-aligned with each other when the high-speed clocks of each TX-RX pair are edge aligned,
    wherein the DLL is a phase-shifter DLL that includes an adjustable phase shifter, and
    wherein the method further comprises the DLL minimizing a phase error between the system clock and the module clock to edge-align the high-speed clock of each TX-RX pair.

13. The method of claim 12 further comprising:
    forwarding the module clock from a receive register to a transmit register of each TX-RX pair to clock a parallel data stream from the transmit register to the receive register; and
    sourcing the system clock to each TX-RX pair.

14. The method of claim 13 further comprising:
    generating a phase-detector output based on a phase difference between the module clock and the system clock;
    adjusting a phase of the system clock based on the phase-detector output and to generate a phase-adjusted module clock signal for use by the associated TX-RX pair in generating the high-speed clock for generation of an associated one of the output data; and
    generating the module clock from the high-speed clock.

15. The method of claim 14 further comprising generating Linear Frequency Modulated (LFM) waveforms from the output data.

16. A RADAR receiver comprising:
    the synchronous data system to generate output data; and
    circuitry to generate Linear Frequency Modulated (LFM) waveforms from the output data, wherein the synchronous data system comprises a plurality of transmitter-receiver (TX-RX) pairs, each TX-RX pair associated with a delay-locked loop (DLL) and arranged to generate corresponding data based on a high-speed clock of an associated TX-RX pair, wherein the DLL associated with each TX-RX pair is arranged to synchronize a module clock of the TX-RX pair to a system clock so that the output data of the TX-RX pairs are phase aligned with each other, and wherein the DLL is a phase-shifter DLL that includes an adjustable phase shifter arranged to minimize a phase error between the system clock and the module clock to edge-align the high-speed clocks of each TX-RX pair.

17. The RADAR receiver of claim 16 wherein the output data comprise either digital words or analog signals that represent the LFM waveforms.

* * * * *